US012711064B2

(12) United States Patent
Fico et al.

(10) Patent No.: US 12,711,064 B2
(45) **Date of Patent: *Aug. 18, 2026**

(54) TECHNOLOGIES FOR CONFIGURABLE CACHING, DEDUPLICATION, AND RATE LIMIT HANDLING

(71) Applicant: Genesys Cloud Services, Inc., Menlo Park, CA (US)

(72) Inventors: Charles D. Fico, Indianapolis, IN (US); Stefan Brinton, Indianapolis, IN (US); Chad Slappey, Indianapolis, IN (US); Hanna Wade, Indianapolis, IN (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,504

(22) Filed: Dec. 26, 2024

(65) Prior Publication Data

US 2025/0123964 A1 Apr. 17, 2025

Related U.S. Application Data

(63) Continuation of application No. 18/345,243, filed on Jun. 30, 2023, now Pat. No. 12,210,453.

(51) Int. Cl.

*G06F 12/06* (2006.01)
*G06F 12/0891* (2016.01)
*G06F 12/123* (2016.01)

(52) U.S. Cl.

CPC ...... *G06F 12/0646* (2013.01); *G06F 12/0891* (2013.01); *G06F 12/123* (2013.01)

(58) Field of Classification Search

CPC ............. G06F 12/0646; G06F 12/0891; G06F 12/123; G06F 12/0873; G06F 12/0868;

(Continued)

(56) References Cited

U.S. PATENT DOCUMENTS 7,908,436 B1 * 3/2011 Srinivasan ............ G06F 3/0622 711/114
11,403,212 B1 * 8/2022 Singha ................ G06F 9/45558

(Continued)

FOREIGN PATENT DOCUMENTS

JP 2001209500 A 8/2001
JP 2019-128949 A 8/2019
JP 2022-064720 A 4/2022

OTHER PUBLICATIONS

NPL: "How to stop getting rate limited by API" by Donnelly; disclosed in IDS filed on Mar. 13, 2025 (Year: 2023).*

(Continued)

*Primary Examiner* — Tracy C Chan
(74) *Attorney, Agent, or Firm* — Taft Stettinius & Hollister LLP

(57) ABSTRACT

A method for configurable caching, deduplication, and rate limit handling of user interface data requests according to an embodiment includes receiving a data request initiated by a user interface element of a user interface, determining whether a deduplication cache includes a deduplication entry associated with the data request, determining whether a main cache includes a cache entry associated with the data request in response to determining that the deduplication cache does not include the deduplication entry, determining whether the data request is associated with a rate-limited group of application programming interface endpoints in response to determining that the main cache does not include the cache entry or determining that the cache entry has expired, and making the data request to a backend system after a predefined server retry period associated with the rate-limited group has elapsed in response to determining that the data request is associated with the rate-limited group.

18 Claims, 4 Drawing Sheets

(58) Field of Classification Search
CPC ........ G06F 3/067; G06F 9/451; G06F 9/5072; G06F 9/547; G06F 2209/504; G06F 16/1748
See application file for complete search history.

(56) References Cited

U.S. PATENT DOCUMENTS

| | | | | |
|---|---|---|---|---|
| 2014/0304464 | A1* | 10/2014 | Bert | G06F 3/0688 711/105 |
| 2015/0134625 | A1 | 5/2015 | Lentini et al. | |
| 2015/0372910 | A1* | 12/2015 | Janakiraman | H04L 45/74 370/392 |
| 2019/0068622 | A1 | 2/2019 | Lin et al. | |
| 2019/0107953 | A1 | 4/2019 | Garg et al. | |
| 2019/0227941 | A1 | 7/2019 | Chang et al. | |
| 2019/0392150 | A1* | 12/2019 | Shevade | G06F 9/5072 |
| 2020/0137097 | A1 | 4/2020 | Zimmermann et al. | |
| 2021/0124687 | A1 | 4/2021 | Meiri et al. | |
| 2021/0144227 | A1 | 5/2021 | Gay | |
| 2022/0035734 | A1 | 2/2022 | Harel et al. | |
| 2023/0054696 | A1 | 2/2023 | Kappes et al. | |
| 2023/0164074 | A1* | 5/2023 | Gupta | H04L 49/206 709/224 |

OTHER PUBLICATIONS

The International Search Report and Written Opinion regarding co-pending PCT application, having application No. PCT/US2024/026158, issued on Jul. 24, 2024.
Notice of Reasons for Refusal of co-pending JP Patent Application No. 2024-564595, dated Aug. 28, 2025.
Examination Report; Australian Patent Office; Australian Patent Application No. 2024287275; Feb. 5, 2025; 5 pages.
Stemmler, K.; How Apollo REST Data Source Deduplicates and Caches API calls [Deep Dive]; GraphQL; Dec. 14, 2019; 17 pages; available at https://khalilstemmler.com/blogs/graphql/how-apollo-rest-data-source-caches-api-calls/.
Donnelly, D.; How to Stop Being Rate Limited: Best Practices for Making API Calls at Scale; Merge; Mar. 15, 2023; 16 pages; available at https://web.archive.org/web/20230315191831/https://www.merge.dev/blog/how-to-stop-being-rate-limited-best-practices-for-making-api-calls-at-scale.

* cited by examiner

A FROM FIG. 3

318 RATE-LIMITED GROUP?

YES

320 DELAY FOR SERVER RETRY TIME

NO

322 MAKE DATA REQUEST 332 429 ERROR?

YES

NO

324 REQUEST SUCCEED?

YES

NO

326 RETRIABLE ERROR?

YES

330 RETRY LIMIT REACHED?

NO

YES

NO

328 RETURN DATA REQUEST FAILURE

TECHNOLOGIES FOR CONFIGURABLE CACHING, DEDUPLICATION, AND RATE LIMIT HANDLING

CROSS-REFERENCE TO RELATED APPLICATIONS

This application is a continuation of U.S. patent application Ser. No. 18/345,243, filed on Jun. 30, 2023, the contents of which are incorporated herein by reference in their entirety.

BACKGROUND

Web development traditionally follows a formula of building single page applications (SPAs) or multipage applications in which every page implements its own handling for application programming interface (API) requests, caching, settings, permissions, events, and logging. Page-level data stores are common solutions, but they are linked to specific frameworks and require revision when implementing solutions across multiple frameworks. This approach leads to duplication of code across multiple small repositories, or all code relying on the handling to be placed in the same repository. Duplication of the code leads to duplication of work during debugging, dependency upgrades, or regular maintenance as well as inconsistencies across pages. On the other hand, having all code rely on the service layer within one repository leads to large, complex, and hard to manage repositories that slow down the process of maintenance of existing features and the development of new features. Components must also be rebuilt when moved between pages and user interface frameworks (e.g., due to page- or framework-level logic implementation differences).

SUMMARY

One embodiment is directed to a unique system, components, and methods for configurable caching, deduplication, and rate limit handling of user interface data requests. Other embodiments are directed to apparatuses, systems, devices, hardware, methods, and combinations thereof for configurable caching, deduplication, and rate limit handling of user interface data requests.

According to an embodiment, a method for configurable caching, deduplication, and rate limit handling of user interface data requests may include receiving a data request initiated by a user interface element of a user interface, determining whether a deduplication cache includes a deduplication entry associated with the data request, determining whether a main cache, different from the deduplication cache, includes a cache entry associated with the data request in response to determining that the deduplication cache does not include the deduplication entry, determining whether the data request is associated with a rate-limited group of application programming interface endpoints in response to one of (i) determining that the main cache does not include the cache entry associated with the data request or (ii) determining that the cache entry associated with the data request has expired, and making the data request to a backend system after a predefined server retry period associated with the rate-limited group has elapsed in response to determining that the data request is associated with the rate-limited group.

In some embodiments, the deduplication entry may indicate that a previous data request identical to the data request initiated by the user interface element of the user interface was made within a threshold period of time.

In some embodiments, the method may further include determining whether the data request is associated with a predefined maximum cache age in response to determining that the main cache includes the cache entry associated with the data request.

In some embodiments, the method may further include determining whether the cache entry associated with the data request has expired based on a creation time of the cache entry and the predefined maximum cache age in response to determining that the data request is associated with the predefined maximum cache age.

In some embodiments, the method may further include determining whether the cache entry associated with the data request has expired based on an expiration time of the cache entry defined by the cache entry in response to determining that the data request is not associated with the predefined maximum cache age.

In some embodiments, the method may include making the data request to the backend system immediately in response to determining that the data request is not associated with any rate-limited group.

In some embodiments, the method may further include receiving an error associated with the data request in response to a failure to fulfill the data request, determining whether the error associated with the data request is a retriable error, determining whether a predefined retry limit has been reached in response to determining that the error associated with the data request is the retriable error, and retrying the data request in response to determining that the predefined retry limit has not been reached.

In some embodiments, retrying the data request may include retrying the data request after the predefined server retry period in response to determining that the retriable error is a 429 error.

In some embodiments, the predefined retry limit may be a maximum number of retry attempts that can be made.

In some embodiments, determining whether the data request is associated with the rate-limited group of application programming interface endpoints may include determining whether an application programming interface endpoint to which the data request is directed is included in the rate-limited group of application programming interface endpoints.

In some embodiments, the deduplication cache may be configured to store one or more promises, wherein each of the one or more promises is associated with a previous respective data request.

In some embodiments, the deduplication cache may be configured to store data returned in response to previous data requests with a configurable timeout.

In some embodiments, the main cache may be configured to store data returned in response to previous data requests.

According to another embodiment, a system for configurable caching, deduplication, and rate limit handling of user interface data requests may include a deduplication cache, a main cache different from the deduplication cache, at least one processor, and at least one memory comprising a plurality of instructions stored thereon that, in response to execution by the at least one processor, causes the system to receive a data request initiated by a user interface element of a user interface, determine whether the deduplication cache includes a deduplication entry associated with the data request, determine whether the main cache includes a cache entry associated with the data request in response to a determination that the deduplication cache does not include the deduplication entry, determine whether the data request is associated with a rate-limited group of application programming interface endpoints in response to a determination that one of (i) the main cache does not include the cache entry associated with the data request or (ii) the cache entry associated with the data request has expired, and make the data request to a backend system after a predefined server retry period associated with the rate-limited group has elapsed in response to a determination that the data request is associated with the rate-limited group.

In some embodiments, the deduplication entry may indicate that a previous data request identical to the data request initiated by the user interface element of the user interface was made within a threshold period of time.

In some embodiments, the plurality of instructions may further cause the system to determine whether the data request is associated with a predefined maximum cache age in response to a determination that the main cache includes the cache entry associated with the data request, determine whether the cache entry associated with the data request has expired based on a creation time of the cache entry and the predefined maximum cache age in response to a determination that the data request is associated with the predefined maximum cache age, and determine whether the cache entry associated with the data request has expired based on an expiration time of the cache entry defined by the cache entry in response to a determination that the data request is not associated with the predefined maximum cache age.

In some embodiments, the plurality of instructions may further cause the system to receive an error associated with the data request in response to a failure to fulfill the data request, determine whether the error associated with the data request is a retriable error, determine whether a predefined retry limit has been reached in response to a determination that the error associated with the data request is the retriable error, and retry the data request in response to a determination that the predefined retry limit has not been reached.

In some embodiments, to retry the data request may include to retry the data request after the predefined server retry period in response to a determination that the retriable error is a 429 error.

In some embodiments, the predefined retry limit may be a maximum number of retry attempts that can be made.

In some embodiments, the deduplication cache may be configured to store one or more promises, wherein each of the one or more promises is associated with a previous respective data request, and the main cache may be configured to store data returned in response to previous data requests.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
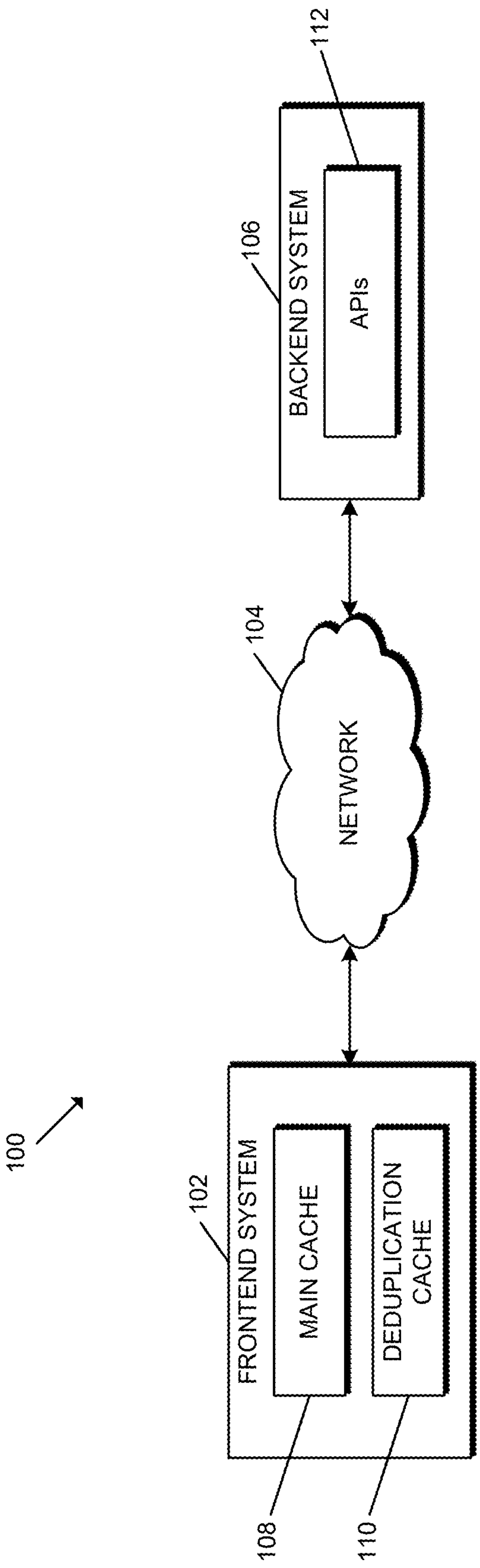
FIG. 1 depicts a simplified block diagram of at least one embodiment of a system for configurable caching, deduplication, and rate limit handling of user interface data requests.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Traditional web development paradigms lead to duplication of work, inefficiencies, and inconsistencies. Each of the existing libraries for the implementation of API handling, caching, logging, and other features are generally narrowly focused to a specific function and fail to provide key features that would minimize requests to cloud service and handle dispersed microservice 429 errors. Caching solutions are very high level, generic, unable to cache based on parameters, and not dynamically configurable. The existing technologies result in substantial wasted development and computational resources (e.g., CPU cycles, RAM, storage, etc.). Both at the frontend (e.g., a client device) and the backend (e.g., a cloud device), resources are wasted from inefficient handling of retries and requests. Although microservices allow for economies of scale, because they allow multiple developers to build and deploy a service layer, that allows for the failure to use a common library and for re-implementing and copying code. Similar benefits and issues are present with micro-apps.

It should be appreciated that the technologies described herein allow for common service orchestrating via request, data, and configuration services to drive standalone component development. For example, entry methods are provided for standard RESTful API calls, and integrated with these entry points may be parameterized configurable caching, deduplication, and logic for handling HTTP 429 Too Many Requests status codes or errors. Caching combined with request deduplication as described herein may provide data flow minimization for RESTful API calls, which improves user interface (UI) performance and allows multiple user interface components to be individually deployed without concerns regarding managing API flow to the cloud service layer. It should be further appreciated that the technologies described herein may be used as a common service layer, which allows user interface components to be freely moved between micro apps because of the self-contained and web framework agnostic nature of the solution. Additionally, the technologies allow for the reduction of re-requesting data from the service layer, decreasing processing across the cloud stack and making the entire solution more efficient and sustainable.

Further, as described herein, modular and self-contained API wrappers may be used to encapsulate logic established on top of basic APIs to handle more complex API interactions and data manipulation. In particular, RESTful methods may be handled in a common way (e.g., coded once) in a base object where caching and retries as described herein may be leveraged in these calls. This ensures that implementers of particular APIs do not need to be concerned with or re-implement retrying, deduplication, or basic handling of RESTful methods. For example, a particular API may involve a POST operation that then asynchronously returns a file down URL. In some embodiments, the entire call flow may be encapsulated in an API wrapper, once, such that developers do not have to re-implement that behavior. In another example embodiment, user identifiers may be returned by a particular API but the end developer desires the name of the user. In such embodiments, the appropriate API calls may be paired with caching to expose username responses, rather than user identifiers, which ensures common, consistent, and streamlined coding from the user interface developer's perspective. It should be further appreciated that API wrappers allow for APIs to be grouped together and written into individual files such that only the APIs that a user interface needs are incorporated into the package, which ensures that sizes are minimized. Additionally, developers knowledgeable on specific APIs may write the handlers once, addressing any special caching or rate limiting behaviors that should be considered at development time, and reducing code duplication and bugs.

As described below, for example in the method 300 of FIGS. 3-4, configurable caching, deduplication, and/or 429 logic may be used in conjunction with one another. For example, parameterized configurable caching may be leveraged because RESTful API data responses are highly dependent on the request context, query, and/or body. Accordingly, configurable caching leverages various input parameters along with controls around lifetime (e.g., time-to-live (TTL)) of cache entries to allow for global, grouped, or individual settings for requests. In other words, in some embodiments, caching may be configured for each application, for each endpoint, and/or for each individual type of request. Additionally, the service may have a default configuration for TTL set at the page level, which may be overridden on an individual basis.

In some embodiments, cache groupings may be used to group together sets of data, which allows for performing set operations on the cache such as manual invalidation of linked data. It should be appreciated that such features may be useful in managing sets of interrelated requests, such as a group of requests that retrieve information from or about a single entity. For example, cache groupings may allow the post-step of a request known to affect the requests' cache entries to change those cache entries as a single operation instead of individual cache entry operations. Accordingly, cache groupings may allow for cache operations that are quicker to write and/or otherwise more efficient. Additionally, rate limit groupings and max cache age parameters may also be used as described in greater detail below.

Retry logic with advanced 429 logic may be implemented to handle the varied and sometimes interconnected rate limits of a microservice architecture. For example, rate limit grouping may be used in conjunction with advanced 429 logic to "forward" 429 errors to all affected requests, which prevents a request within a grouping that has received a 429 status code from being made before the associated wait time has elapsed. It should be appreciated that each API endpoint may define a separate rate limit, and the rate limits and rate limit groupings may depend on the backend service. The particular API endpoints associated with or assigned to a particular rate limit grouping may be predefined by a domain expert, for example, as an API wrapper is developed. The speed and efficiency of the user interface may thereby be improved by preventing failure-bound requests from being made. Additionally, as described in greater detail below, the 429 logic may cause requests blocked by a 429 status code to be consolidated, reducing the instances of duplicate 429 errors from waiting requests.

It should be appreciated that different API sections may have different retry logic. For example, some APIs might consider different error codes to be retriable just because of the specific implementation. Retry groupings may be leveraged to group API requests that share common retry behavior. Doing so allows extensible retry logic to be provided that can be customized to suit the needs of a group of endpoints. For example, a group of requests with a shared error may be fixed with an additional request made as part of the retry process. In various embodiments, for each of the retry groupings, what constitutes a retriable error may be defined, along with the particular actions to be performed to retry and error and/or other features.

As described in greater detail below, the system may leverage deduplication techniques to consolidate identical requests into a single request within a configurable period such that the requests are only handled a single time. In other words, the duplication techniques effectively function as a short-lived deduplication cache. Although not necessarily a "cache" per se, the deduplication cache is described herein as such for simplicity and brevity of the description. In the illustrative embodiment, the deduplication cache stores promises associated with data requests rather than the actual data objects requested (which may be stored in a "main cache" or other memory). Deduplication ensures that if user interface elements are not debounced that requests are not spamming the backend server. This allows for different user interface components to be developed independently without knowledge of one another and without concern for making multiple identical calls to the backend server.

In some embodiments, page configuration settings may be established at a page level, but also be overridden if a specific application requires custom settings. Depending on the particular application, a micro-app may utilize different behavior patterns. For example, it may be desirable for the data to be cached for only 10 seconds rather than 120 seconds. Accordingly, the page may be able to configure the behavior patterns at a top level, and it impacts all of the components individually. Accordingly, even if a dozen components are developed, it is not necessary to know the cache window, as the page knows the cache window and ascribes it to the individual components (e.g., pushing down high-level configurations if not overridden at the lower level). As such, it should be appreciated that the page configuration scheme may provide a default configuration for quick development, while also allowing individualized configuration of feature toggles, permission service, data service, notification service, retries, deduplication cleanup, application-level cache, and/or other features or parameters.

Referring now to FIG. 1, a system 100 for configurable caching, deduplication, and rate limit handling of user interface data requests may include a frontend system 102, a network 104, and a backend system 106. Additionally, in the illustrative embodiment, the frontend system 102 includes a main cache 108 and a deduplication cache 110, and the backend system 106 includes application programming interfaces (APIs) 112.

Although only one frontend system 102, one network 104, and one backend system 106 are shown in the illustrative embodiment of FIG. 1, the system 100 may include multiple frontend systems 102, networks 104, and/or backend systems 106 in other embodiments. For example, in some embodiments, multiple backend systems 106 may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent. Additionally, it should be appreciated that the system architecture represented by the system 100 in FIG. 1 is for illustrative purposes only, and the system 100 may include additional and/or alternative devices/systems in other system architectures. Further, it should be appreciated that each of the frontend system 102, the network 104, and/or the backend system 106 may include multiple devices and/or subsystems. For example, in some system architectures, the backend system 106 may include at least an application server and a database server. In cloud-based embodiments, the frontend system 102 and/or the backend system 106, or portions thereof, may be embodied as a server-ambiguous computing solution similar to that described below.

The frontend system 102 may be embodied as any one or more types of devices/systems capable of performing the functions described herein. For example, in the illustrative embodiment, the frontend system 102 includes a client device configured to launch a user interface with which a user may interact. As the user interacts with the user interface, an element of the user interface may initiate a data request directed to a particular API 112 of the backend system 106 (e.g., in response to the user clicking a user interface element such as a button). In the illustrative embodiment, the frontend system 102 includes a main cache 108 and a deduplication cache 110.

The main cache 108 is configured to store data results of data requests made via the user interface (e.g., data objects), whereas the deduplication cache 110 stores promises, which essentially just indicates that it will have a result at some point in time but with no references to the main cache 108. In some embodiments, as described herein, the deduplication cache 110 stores data returned in response to previous data requests with a configurable timeout. It should be appreciated that a promise is an object that represents the eventual completion or failure of an asynchronous operation and its resulting value rather than the value itself. As described below, the deduplication cache 110 may be leveraged to ensure that if multiple identical data requests are made within a short predefined time period, those data requests are consolidated into a single request so as to avoid spamming the backend system 106. It should be appreciated that each of the main cache 108 and the deduplication cache 110 may be embodied as, or include, any type of memory, data storage, and/or data structure for storing data and performing the functions described herein. Further, although the main cache 108 and the deduplication cache 110 are depicted as forming a portion of the frontend system 102, it should be appreciated that the main cache 108 and/or the deduplication cache 110 may form a portion of one or more other devices/systems of the system 100 in other embodiments.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106 of the system 100. It should be appreciated that the various devices/systems 102, 106 may communicate with one another via different networks 104 depending on the source and/or destination devices/systems 102, 106.

The backend system 106 may be embodied as any one or more types of devices/systems capable of performing the functions described herein. As shown, the backend system 106 includes various APIs 112 and corresponding API endpoints from which the frontend system 102 makes data requests. As described above, it should be appreciated that the number and type of devices included in the backend system 106 may vary depending on the particular architecture of the system 100. It should be appreciated that each of the frontend system 102, the network 104, and the backend system 106 may be embodied as, executed by, form a portion of, or associated with any type of device/system, collection of devices/systems, and/or portion(s) thereof suitable for performing the functions described herein (e.g., the computing device 200 of FIG. 2).

Figure 2:
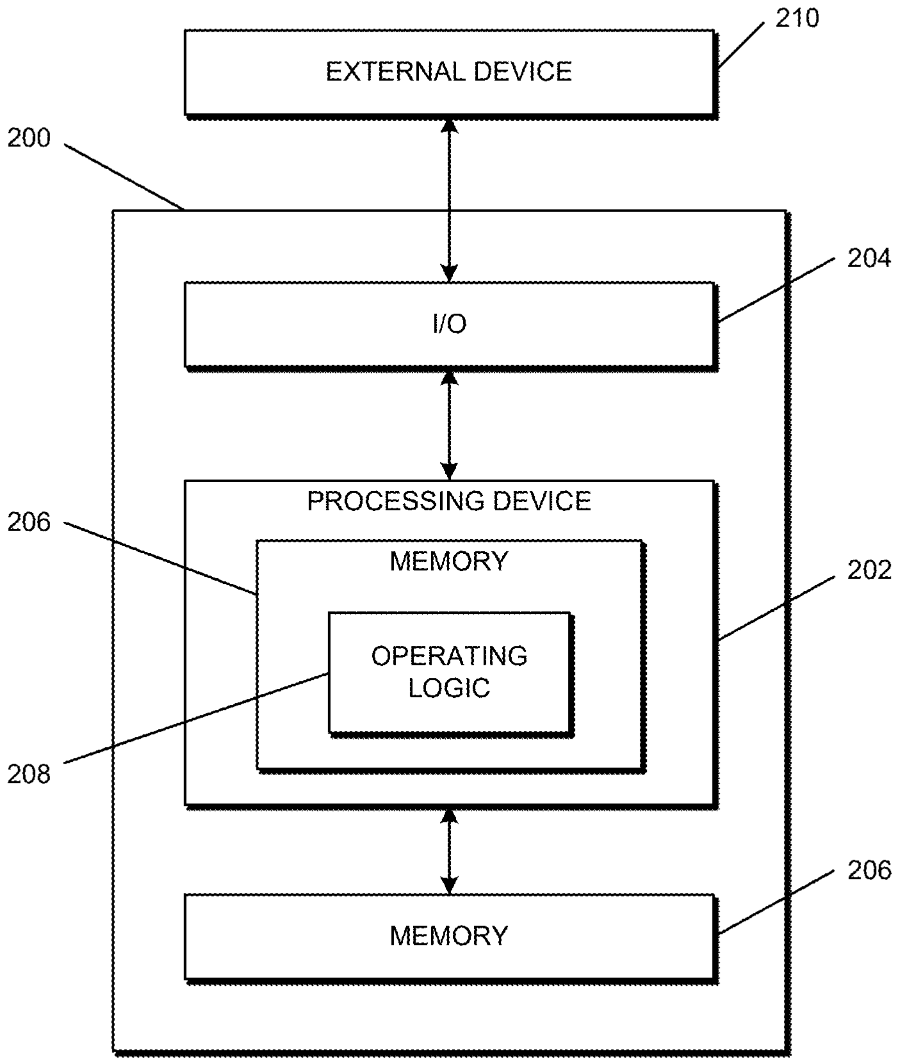
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein, the various servers and computer devices thereof may be located on local computing devices 200, remote computing devices 200 (e.g., off-site or in a cloud-based or cloud computing environment, for example, in a remote data center connected via a network), or some combination thereof depending on the particular embodiment. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
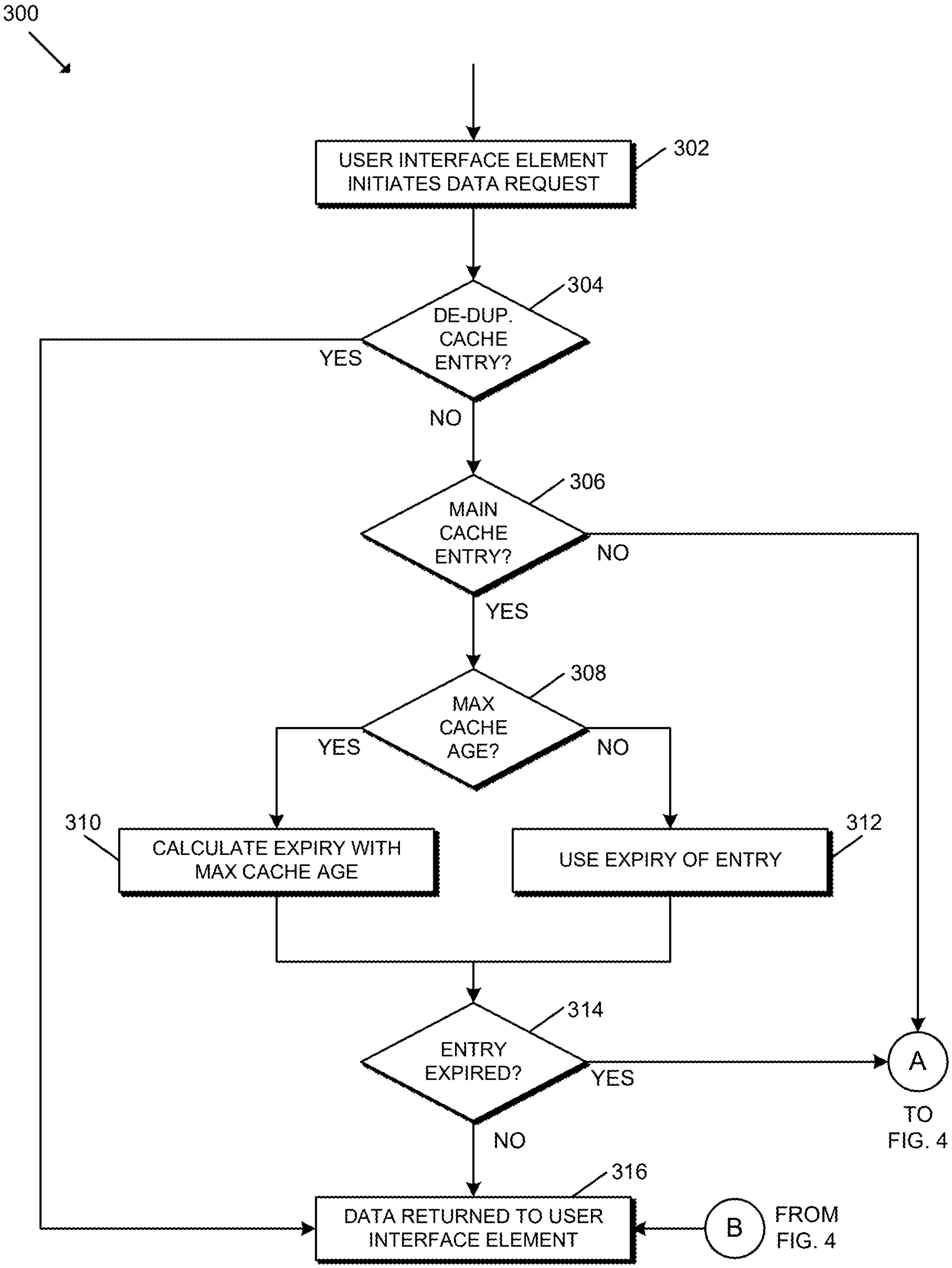
FIGS. 3-4 are a simplified flow diagram of at least one embodiment of a method of configurable caching, deduplication, and rate limit handling of user interface data requests.
Figure 4:
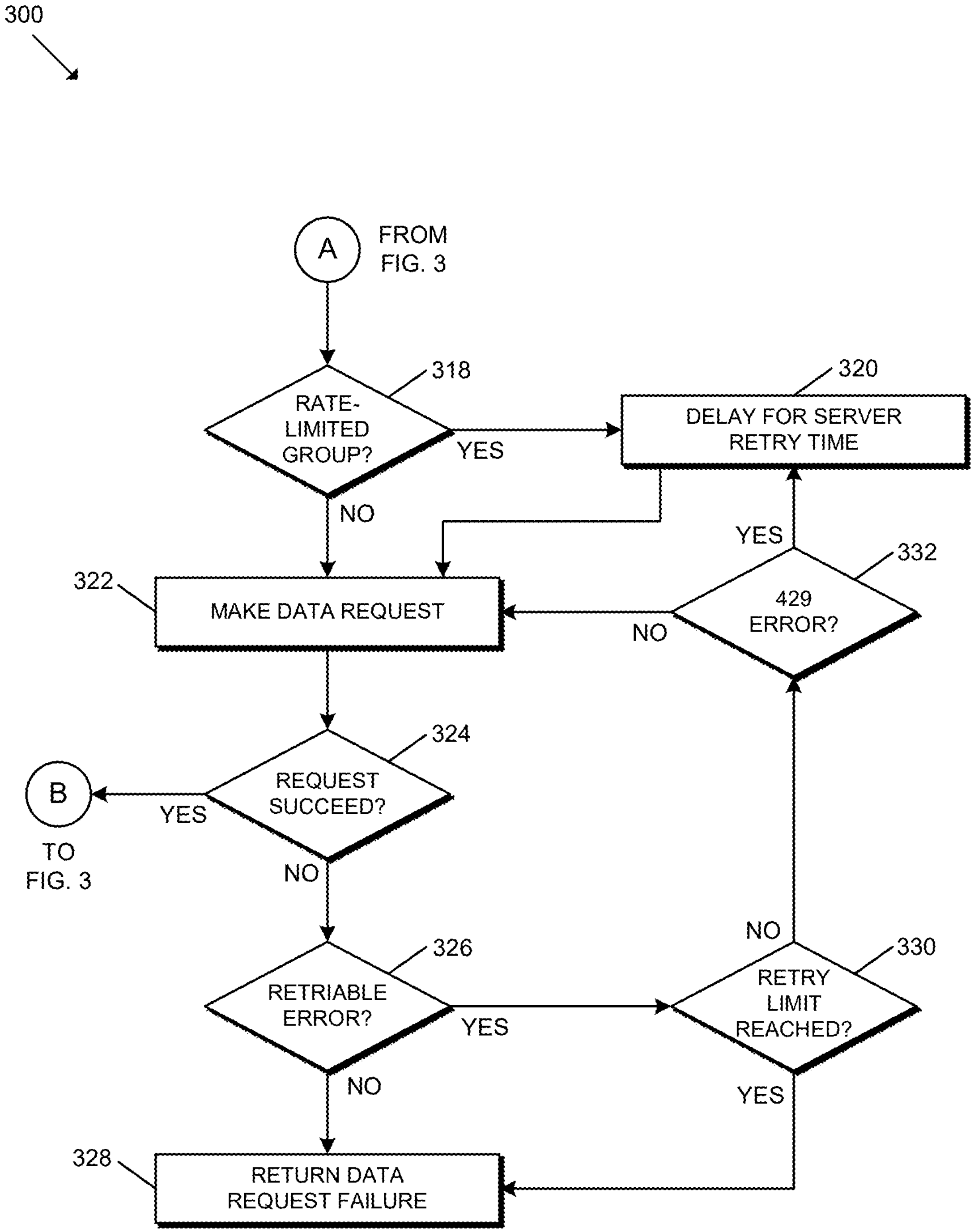

Referring now to FIGS. 3-4, in use, the system 100 may execute a method 300 for configurable caching, deduplication, and rate limit handling of user interface data requests. It should be appreciated that the particular blocks of the method 300 are illustrated by way of example, and such blocks may be combined or divided, added or removed, and/or reordered in whole or in part depending on the particular embodiment, unless stated to the contrary. Because the system 100 may have various different system architectures, the blocks of the method 300 of FIGS. 3-4 are described primarily as being executed simply by the system 100 for simplicity and brevity of the description.

The illustrative method 300 begins with block 302 of FIG. 3 in which a user interface element initiates a data request. It should be appreciated that the data request may reference the relevant API endpoint/URL and include any relevant parameters/data. In block 304, the system 100 determines whether the deduplication cache 110 includes a deduplication entry associated with the data request (e.g., indicating that a previous identical data request was made within a configurable threshold period of time). For example, as described above, the deduplication cache 110 may be configured to store promises associated with respective data requests. Accordingly, the various deduplication entries in the deduplication cache 110 are indicative of a previous data request being made within a threshold period of time (i.e., the expiry period for the deduplication entry, after which it may be removed from the deduplication cache 110). For example, in one embodiment, the threshold period of time may be 10 ms, whereas in another embodiment, the threshold may be 100 ms. It should be appreciated that certain HTTP methods are considered non-idempotent and not generally cached. However, in the illustrative embodiment, the deduplication cache 110 nonetheless caches them in the sense that it is the request or promise itself that is being cached rather than the actual resultant data. It should be appreciated that the deduplication cache 110 is leveraged to ensure that duplicate data requests are not made within a predefined time period (e.g., due to a user inadvertently quickly clicking an element of the user interface repeatedly).

If the system 100 determines, in block 304, that there is an associated deduplication entry in the deduplication cache 110, the method 300 advances to block 316 in which the data request is made and the data is returned to the user interface element. In other words, if there is an associated deduplication entry in the deduplication cache 110, then the data request has already been made and the system 100 can await for the requested data to be returned. However, if the system 100 determines, in block 304, that the deduplication cache 110 does not include an associated deduplication entry, the method 300 advances to block 306 in which the system 100 determines whether the main cache 108 includes a cache entry associated with the data request.

If the system 100 determines, in block 306, that the main cache 108 includes a cache entry associated with the data request, the method 300 advances to block 308 in which the system 100 determines whether the data request is associated with a predefined maximum cache age. In other words, the system 100 determines whether the data request includes a maximum cache age parameter that overrides any expiration time provided by the cache entry itself. It should be appreciated that different components may have different notions of what is acceptable in terms of the TTL of a data response. For example, one component may only accept data that is maximally two minutes old, whereas another component may accept data that is ten minutes old.

If the system 100 determines, in block 308, that the data request is associated with a predefined maximum cache age, the method 300 advances to block 310 in which the system 100 calculates the cache entry's expiration using the max cache age. More specifically, the system 100 may determine whether the cache entry associated with the data request has expired based on the creation time of the cache entry and the predefined maximum cache age (e.g., with the expiration being the maximum cache age after the creation time of the cache entry). However, if the system 100 determines, in block 308, that the data request is not associated with a predefined maximum cache age, the method 300 advances to block 312 in which the system 100 uses the expiry of the cache entry associated with the data request, such that the system 100 may determine whether the cache entry associated with the data request has expired based on the expiration time defined by the cache entry itself. The method 300 advances from blocks 310, 312 to block 314 in which the system 100 determines whether the cache entry has expired. If not, the method 300 advances to block 316 in which the data request is made and the data is returned to the user interface element.

Returning to block 306, if the system 100 determines that the main cache 108 does not include a cache entry associated with the data request, or if the system 100 determines, in block 314, that the cache entry exists but has expired, then the method 300 advances to block 318 of FIG. 4 in which the system 100 determines whether the data request is associated with a rate-limited group of API endpoints. As described above, rate-limited groups of API endpoints may be predefined by the system 100 to help avoid the transmission of certain unnecessary data requests. For example, in an embodiment, the GET_USER and GET_USERS endpoints may belong to the same rate-limited grouping such that if the system 100 already knows that the GET_USER request has been rate limited, then the GET_USERS request should be deferred so as to avoid an inevitable 429 error.

If the system 100 determines, in block 318, that the data request is associated with a rate-limited group, the method 300 advances to block 320 in which the system 100 delays for the corresponding server retry time period before making the data request to the backend system 106 in block 322. If the system 100 determines, in block 318, that the data request is not associated with a rate-limited group, the method 300 advances to block 322 in which the data request may be made without delay.

In block 324, the system 100 determines whether the data request was successful. If so, the method 300 returns to block 316 of FIG. 3 in which the data request is made and the data is returned to the user interface element. However, if the data requests fails, an error or status code associated with the failure to fulfill the data request may be provided, and the method 300 advances to block 326 in which the system 100 determines whether the error associated with the data request is a retriable error. If not, the method 300 advances to block 328 in which a data request failure is returned to the user interface element. However, if the system 100 determines, in block 326, that the error is retriable, the method 300 advances to block 330 in which the system 100 determines whether a predefined retry limit has been reached. It should be appreciated that the predefined retry limit may be configurable, and may defined the maximum number of retry attempts that can be made. In some embodiments, the system 100 may utilize different retry attempts for different circumstances (e.g., different API endpoints, different error types, etc.). If the predefined retry limit has been reached, the method 300 advances to block 328 in which a data request failure is returned to the user interface element.

If the predefined retry limit has not been reached, however, the system 100 may retry the data request. More specifically, in the illustrative embodiment, the method 300 advances to block 332 in which the system 100 determines whether the retriable error is a 429 error (e.g., associated with an HTTP 429 Too Many Requests status code or error). If so, the method 300 advances to block 320 in which the system 100 delays for a corresponding server retry period (e.g., provided by the 429 error) before retrying the data request. However, if the retriable error is not a 429 error, the method 300 advances to block 322 in which the data request may be made without delay.

Although the blocks 302-332 are described in a relatively serial manner, it should be appreciated that various blocks of the method 300 may be performed in parallel in some embodiments.

What is claimed is:

1. A method for configurable caching, deduplication, and rate limit handling of user interface data requests, the method comprising:

receiving a data request initiated by a user interface element of a user interface;

determining whether a deduplication cache includes a deduplication entry associated with the data request;

determining whether a main cache, different from the deduplication cache, includes a cache entry associated with the data request in response to determining that the deduplication cache does not include the deduplication entry; and making the data request to a backend system after (i) determining that the main cache does not include the cache entry associated with the data request or (ii) determining that the cache entry associated with the data request has expired;

wherein the main cache is configured to store data returned in response to previous data requests.

2. The method of claim 1, wherein making the data request to the backend system further comprises making the data request in response to further determining that the data request is associated with a rate-limited group of application programming interface endpoints and that a predefined server retry period associated with the rate-limited group has elapsed.

3. The method of claim 1, wherein the data request represents a request for a data object and determining whether the deduplication cache includes a deduplication entry associated with the data request comprises determining whether the deduplication cache includes a promise associated with a previous data request for the data object that was sent to the backend system within a predefined period of time.

4. The method of claim 1, wherein determining whether the main cache includes the cache entry associated with the data request comprises determining whether the cache entry associated with the data request has expired based on a creation time of the cache entry and a predefined maximum cache age associated with the data request, wherein the predefined maximum cache age overrides an expiration time associated with the cache entry.

5. The method of claim 1, further comprising determining whether the cache entry associated with the data request has expired based on an expiration time of the cache entry defined by the cache entry in response to determining that the data request is not associated with a predefined maximum cache age.

6. The method of claim 1, further comprising making the data request to the backend system immediately in response to determining that the data request is not associated with a rate-limited group.

7. The method of claim 1, further comprising determining whether the data request is associated with the rate-limited group of application programming interface endpoints, including determining whether an application programming interface endpoint to which the data request is directed is included in the rate-limited group of application programming interface endpoints.

8. The method of claim 1, wherein the deduplication cache is configured to store one or more promises, wherein each of the one or more promises is associated with a previous respective data request.

9. The method of claim 1, further comprising determining whether the cache entry associated with the data request has expired by determining whether a time period associated with the cache entry in the main cache exceeds a time to live associated with the data request.

10. A method for configurable caching, deduplication, and rate limit handling of user interface data requests, the method comprising:

receiving a data request initiated by a user interface element of a user interface;

determining whether a deduplication cache includes a deduplication entry associated with the data request;

determining whether a main cache, different from the deduplication cache, includes a cache entry associated with the data request in response to determining that the deduplication cache does not include the deduplication entry; and making the data request to a backend system after (i) determining that the main cache does not include the cache entry associated with the data request or (ii) determining that the cache entry associated with the data request has expired, the method further comprising:

receiving an error associated with the data request in response to a failure to fulfill the data request;

determining whether the error associated with the data request is a retriable error;

determining whether a predefined retry limit has been reached in response to determining that the error associated with the data request is the retriable error; and retrying the data request in response to determining that the predefined retry limit has not been reached.

11. The method of claim 10, wherein retrying the data request comprises retrying the data request after the predefined server retry period in response to determining that the retriable error is a 429 error.

12. The method of claim 10, wherein the predefined retry limit is a maximum number of retry attempts that can be made.

13. A system for configurable caching, deduplication, and rate limit handling of user interface data requests, the system comprising:

a deduplication cache;

a main cache different from the deduplication cache;

at least one processor; and at least one memory comprising a plurality of instructions stored thereon that, in response to execution by the at least one processor, causes the system to:

receive a data request initiated by a user interface element of a user interface;

determine whether the deduplication cache includes a deduplication entry associated with the data request;

determine whether the main cache includes a cache entry associated with the data request in response to a determination that the deduplication cache does not include the deduplication entry; and make the data request to a backend system after a determination that one of (i) the main cache does not include the cache entry associated with the data request or (ii) the cache entry associated with the data request has expired;

wherein the main cache is configured to store resultant data returned from the backend system in response to one or more previous data requests; and the deduplication cache is configured to store one or more promises indicative of the one or more previous data requests and different from the resultant data.

14. The system of claim 13, wherein to determine whether the deduplication cache includes the deduplication entry comprises to determine whether the deduplication cache includes an indication that a previous data request identical to the data request initiated by the user interface element of the user interface was made within a threshold period of time.

15. The system of claim 13, wherein the plurality of instructions further causes the system to:

determine whether the data request is associated with a predefined maximum cache age in response to a determination that the main cache includes the cache entry associated with the data request; and determine whether the cache entry associated with the data request has expired based on a creation time of the cache entry and the predefined maximum cache age in response to a determination that the data request is associated with the predefined maximum cache age.

16. The system of claim 13, wherein the plurality of instructions further causes the system to:

determine whether the data request is associated with a predefined maximum cache age in response to a determination that the main cache includes the cache entry associated with the data request; and determine whether the cache entry associated with the data request has expired based on an expiration time of the cache entry defined by the cache entry in response to a determination that the data request is not associated with a predefined maximum cache age.

17. The system of claim 13, wherein the plurality of instructions further causes the system to:

receive an error associated with the data request in response to a failure to fulfill the data request; and determine whether the error associated with the data request is a retriable error by determining whether the error is a 429 error.

18. The system of claim 17, wherein the plurality of instructions further causes the system to:

determine whether a predefined retry limit has been reached in response to a determination that the error associated with the data request is the retriable error; and retry the data request in response to a determination that the predefined retry limit has not been reached.

* * * * *